United States Patent
Mahalingaiah

[19]

[11] Patent Number: 5,987,592
[45] Date of Patent: Nov. 16, 1999

[54] FLEXIBLE RESOURCE ACCESS IN A MICROPROCESSOR

[75] Inventor: Rupaka Mahalingaiah, Austin, Tex.

[73] Assignee: Advanced Micro Devices, Inc., Sunnyvale, Calif.

[21] Appl. No.: 09/195,181

[22] Filed: Nov. 17, 1998

Related U.S. Application Data

[63] Continuation of application No. 08/874,031, Jun. 12, 1997, Pat. No. 5,854,912.

[51] Int. Cl.$^6$ .................................................. G06F 9/30
[52] U.S. Cl. .......................... 712/200; 712/208; 712/227; 712/42
[58] Field of Search .................................. 712/200, 208, 712/227, 42

[56] References Cited

U.S. PATENT DOCUMENTS

| | | | |
|---|---|---|---|
| 5,574,927 | 11/1996 | Scantlin | 712/41 |
| 5,606,677 | 2/1997 | Balmer et al. | 712/208 |
| 5,752,069 | 5/1998 | Roberts et al. | 712/23 |
| 5,787,266 | 7/1998 | Johnson et al. | 712/216 |

*Primary Examiner*—William M. Treat
*Attorney, Agent, or Firm*—Conley, Rose & Tayon, PC; B. Noel Kivlin; Lawrence J. Merkel

[57] ABSTRACT

A superscalar microprocessor defines a hierarchical structure of registers. The top level of the hierarchy includes performance critical registers and pointers to other levels of the hierarchy. A second level of the hierarchy may include special registers. Special registers may include arrays or groups of data. Special registers may be located in a special register file or remotely located throughout the microprocessor. Remote special registers are accessed via a special register bus. Resources throughout the microprocessor are defined as special registers. In this manner, resources throughout the microprocessor are accessed using special register move instructions that are handled in a manner similar to other register moves in instructions. Accordingly, adding and modifying resources within the microprocessor is transparent to the majority of the circuitry of the microprocessor. Thus, the present invention provides a uniform and flexible mechanism of communicating to resources of a microprocessor.

20 Claims, 9 Drawing Sheets

FLEXIBLE RESOURCE ACCESS IN A MICROPROCESSOR

This application is a continuation of U.S. Ser. No. 08/874,031, filed Jun. 12, 1997, now U.S. Pat. No. 5,854,912.

BACKGROUND OF THE INVENTION

1. Field of the Invention

This invention relates to the field of microprocessors and, more particularly, to special registers within microprocessors.

2. Description of the Relevant Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

Microprocessor designers often design their products in accordance with the x86 microprocessor architecture in order to take advantage of its widespread acceptance in the computer industry. Because the x86 microprocessor architecture is pervasive, many computer programs are written in accordance with the architecture. X86 compatible microprocessors may execute these computer programs, thereby becoming more attractive to computer system designers who desire x86-compatible computer systems. Such computer systems are often well received within the industry due to the wide range of available computer programs.

The x86 microprocessor architecture includes general and special registers. General registers are registers that are readily accessible to all instructions. For example, in the x86 architecture eight general registers (EAX, EBX, ECX, EDX EBP, ESI, EDI and ESP) are defined. The x86 microprocessor architecture also includes special registers. For example, the x86 architecture defines six segment registers (CS, SS, DS, ES, FS and GS), a flag register (EFLAGS) and an instruction pointer register (EIP). In addition, the special registers include a set of model specific registers (MSRs) that may differ between various implementations of an x86 microprocessor. For example, a Time Stamp Counter is not defined as part of the x86 architecture. Some implementations of an x86 microprocessor, however, include a Time Stamp Counter as a special register. The Time Stamp Counter may be used to monitor the performance of a microprocessor. Other examples of special register include temporary registers, microcode registers and processor feature control registers. These registers may be distributed throughout the microprocessor.

Resources within a microprocessor include special registers and other resources such as caches. Access to microprocessor resources is typically accomplished by special instructions. For example, a special instruction to flush the instruction cache may be defined. Likewise, a special instruction for reading or writing to microcode registers may be defined. Typically, when new resources are added to a microprocessor, new special instructions are defined to access those resources. Defining new instructions requires the modification of a significant portion of the microprocessor. For example, adding an instruction to flush the instruction cache may require the modification of the decode unit to recognize the opcode of the new instruction, the modification of the microcode unit to implement the function of the new instruction, the addition of signal lines from the microcode unit to the instruction cache to signal the function of the new instruction, and the modification of the instruction cache to receive the signal and execute the function of the new instruction.

The modification of the microprocessor to accommodate new resources creates significant design and testing problems. Modifying the circuitry of the microprocessor may introduce debug problems, timing problems and speed paths. What is desired is a flexible way to access resources that does not require significant redesign to add new resources.

SUMMARY OF THE INVENTION

The problems outlined above are in large part solved by resource allocation within a microprocessor in accordance with the present invention. All resources of a microprocessor are defined as special registers. The resources are accessed using instructions that appear as simple register access instructions to the majority of the microprocessor circuitry. A hierarchical structure of registers is defined. Performance critical resources reside at the top level of the hierarchy while non-performance critical resources are assigned to lower levels of the resource hierarchy. A standardized interface may be connected to each block of the microprocessor for accessing resources distributed throughout the microprocessor. Accordingly, adding resources and communicating to those resources may not require additional control signals.

Broadly speaking, the present invention contemplates a microprocessor with flexible resource access including a decode unit and a special register unit. The decode unit decodes a first operand field of an instruction, wherein the first operand field identifies a primary register or a pointer to a plurality of special registers. The special register unit is coupled to the decode unit. If the first operand field identifies the pointer to the plurality of special registers, the decode unit conveys instruction information to the special register unit and decodes a second operand field. The special register unit then accesses a special register identified by the second operand field.

The present invention further contemplates a method of accessing special registers comprising: defining a first register level and a second register level, wherein the first register level includes a plurality of primary registers and a pointer to a second register level that includes a plurality of special registers; decoding a first operand field of an instruction, wherein the first operand field identifies one of the plurality of primary registers or the pointer to the second register level; decoding a second operand field of an instruction if the first operand field identifies the pointer to the second register level; and accessing one the plurality of special registers of said second register level identified by the second operand field.

The present invention still further contemplates a microprocessor with flexible resource allocation including: a plurality of special registers including one or more remote special registers and one or more local special registers; a remote special register bus coupled to the one or more remote special registers, wherein the remote special registers are accessed via the remote special register bus; a special register unit is coupled to the remote special register bus; a decode unit is coupled to the special register unit, wherein the decode unit routes instruction information to the special register unit; the special register unit decodes the instruction information and accesses a special register identified by said instruction information. In this manner, the decode unit handles an access to a special register in substantially the same way as an access to a primary register.

BRIEF DESCRIPTION OF THE DRAWINGS

Other objects and advantages of the invention will become apparent upon reading the following detailed description and upon reference to the accompanying drawings in which.

Figure 1:
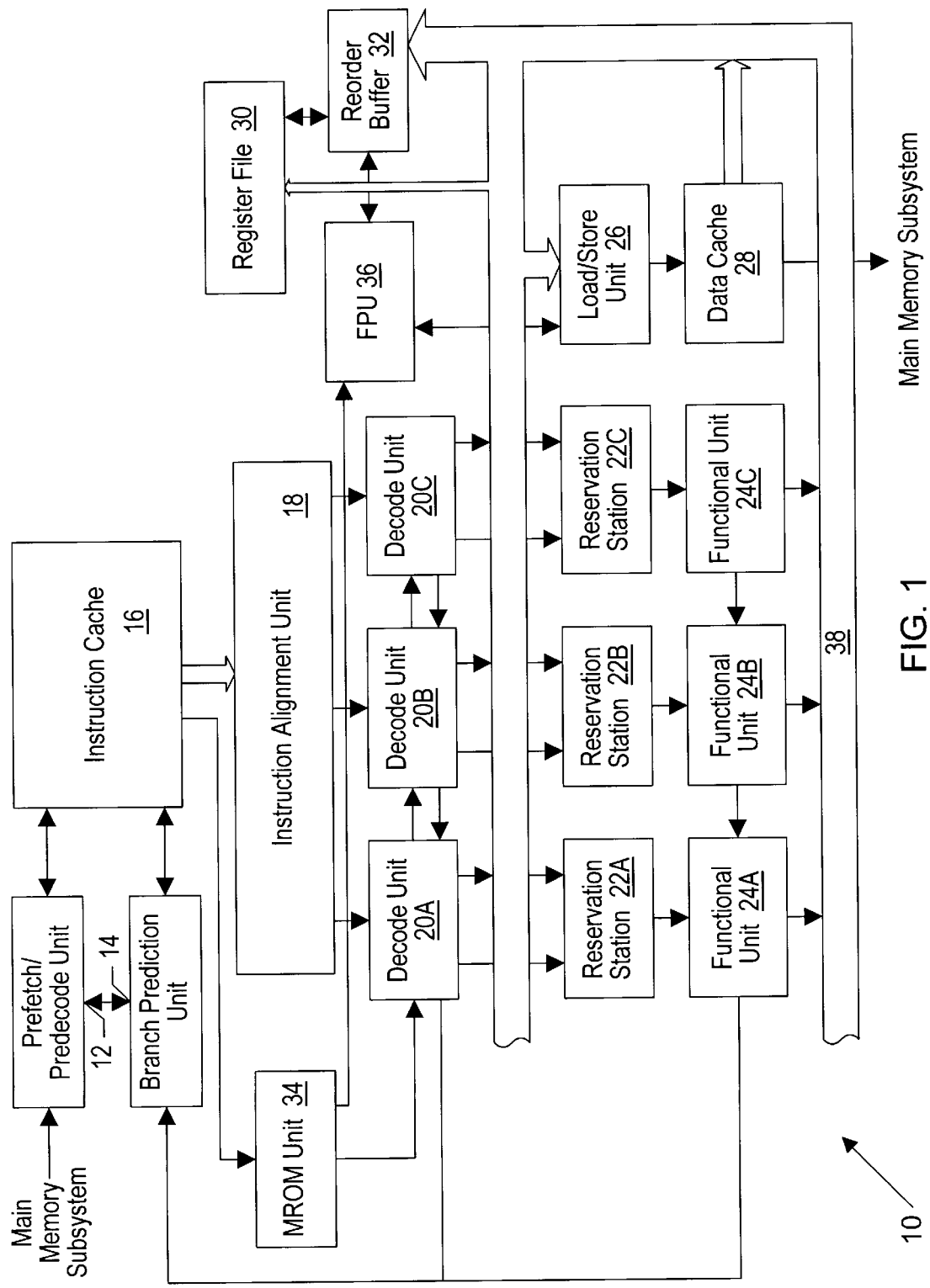
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a floating point unit 36, a reorder buffer 32, and an MROM unit 34. Blocks referred to herein with a reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30, model specific register unit 31, and reorder buffer 32. Functional units 24 are coupled to load/store unit 26, register file 30, model specific register unit 31, and reorder buffer 32 as well. Data cache 28 is coupled to load/store unit 26 and to the main memory subsystem. Finally, MROM unit 34 is coupled to decode units 20.

Microprocessor 10 is configured to align instructions from instruction cache 16 to decode units 20 using instruction alignment unit 18. Instructions are fetched as an aligned plurality of bytes from a cache line within instruction cache 16. Instructions of interest may be stored beginning at any arbitrary byte within the fetched bytes. For example, a branch instruction may be executed having a target address which lies within a cache line. The instructions of interest therefore begin at the byte identified by the target address of the branch instruction. From the instruction bytes fetched, instruction alignment unit 18 identifies the instructions to be executed. Instruction alignment unit 18 conveys the instructions, in predicted program order, to decode units 20 for decode and execution.

Instruction alignment unit 18 includes a byte queue configured to store instruction bytes. An instruction scanning unit within instruction cache 16 separates the instructions fetched into instruction blocks. Each instruction block comprises a predefined number of instruction bytes. The instruction scanning unit identifies up to a predefined maximum number of instructions within the instruction block. Instruction identification information for each of the identified instructions is conveyed to instruction alignment unit 18 and is stored in the byte queue. The instruction identification information includes an indication of the validity of the instruction, as well as indications of the start and end of the instruction within the predefined number of instruction bytes. In one embodiment, the predefined number of instruction bytes comprises eight instruction bytes stored in contiguous main memory storage locations. The eight instruction bytes are aligned to an eight byte boundary (i.e. the least significant three bits of the address of the first of the contiguous bytes are 0). If more than the maximum number of instructions are contained within a particular predefined number of instruction bytes, the instruction bytes are scanned again during a subsequent clock cycle. The same instruction bytes are conveyed as another instruction block, with the additional instructions within the instruction bytes identified by the accompanying instruction identification information. Therefore, an instruction block may be defined as up to a predefined maximum number of instructions contained within a predefined number of instruction bytes.

The byte queue stores each instruction block and corresponding instruction identification information within a subqueue defined therein. The subqueues include a position for each possible valid instruction within the instruction block. The positions store instruction identification information and are maintained such that the instruction identification information for the first valid instruction within the subqueue is stored in a first position within the subqueue, instruction identification information regarding the second valid instruction (in program order) is stored in a second position within the subqueue, etc. When instructions within the subqueue are dispatched, instruction identification information corresponding to subsequent instructions are shifted within the positions of the subqueue such that the first of the remaining instructions is stored in the first position. Advantageously, instruction alignment unit 18 may only consider the instruction information stored in the first position of each subqueue to detect the instruction to be dispatched to decode unit 20A. Similarly, only the second position of the first subqueue (the subqueue storing instructions prior to the instructions stored in the other subqueues in program order) may be considered for dispatch of instructions to decode unit 20B. By managing the subqueues in this manner, logic for selecting and aligning instructions may be simplified. Fewer cascaded levels of logic may be employed for performing the selection and alignment process, allowing for high frequency implementation of microprocessor 10.

Because instructions are variable length, an instruction may begin within a particular instruction block but end in another instruction block. Instructions beginning within a particular instruction block and ending in another instruction block are referred to as "overflow instructions". The subqueue storing the instruction block within which an overflow instruction begins uses the last position to store the overflow instruction's identification information. Unlike the other positions, the instruction identification information of the last position is not shifted from the last position when an overflow instruction is stored therein. Advantageously, instruction alignment unit 18 need only search the last position of a particular subqueue to identify an instruction overflowing from one subqueue to another.

As used herein, the term queue refers to a storage device for storing a plurality of data items. The data items are stored with an ordered relationship between them. For example, the data items of the byte queue are instructions. The ordered relationship between the instructions is the program order of the instructions. Data items are removed from the queue according to the ordered relationship in a first in-first out (FIFO) fashion. Additionally, the term shifting is used to refer to movement of data items within the queue. When a data item is shifted from a first storage location to a second storage location, the data item is copied from the first storage location to the second storage location and invalidated in the second storage location. The invalidation may occur by shifting yet another data item into the second storage location, or by resetting a valid indication in the second storage location.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in an 8 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to instruction cache 16 recording a miss for the instructions in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing the x86 instruction set will next be described. If a given byte is the first byte of an instruction, the start bit for that byte is set. If the byte is the last byte of an instruction, the end bit for that byte is set. For this embodiment of microprocessor 10, instructions which may be directly decoded by decode units 20 are referred to as "fast path" instructions. Fast path instructions may be an example of directly-decoded instructions for this embodiment. The remaining x86 instructions are referred to as MROM instructions, according to one embodiment. For this embodiment, MROM instructions are an example of microcode instructions.

For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an SIB byte would have start, end, and functional bits as follows:

| | |
|---|---|
| Start bits | 10000 |
| End bits | 00001 |
| Functional bits | 11000 |

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Decode unit 20A receives an instruction which is prior to instructions concurrently received by decode units 20B and 20C (in program order). Similarly, decode unit 20B receives an instruction which is prior to the instruction concurrently received by decode unit 20C in program order. As used herein, the term "program order" refers to the order of the instruction as coded in the original sequence in memory. The program order of instructions is the order in which the instructions would be executed upon a microprocessor which fetches, decodes, executes, and writes the result of a particular instruction prior to fetching another instruction. Additionally, the term "dispatch" is used to refer to conveyance of an instruction to an issue position which is to execute the instruction. Issue positions may also dispatch load/store memory operations to load/store unit 26.

Decode units 20 are configured to decode instructions received from instruction alignment unit 18. Register operand information is detected and routed to register file 30, MSR unit 31, and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C. As used herein, the term "issue position" refers to logic circuitry configured to receive an instruction and to execute that instruction. Once the instruction enters the issue position, it remains in that issue position until the execution of the instruction is completed.

Upon decode of a particular instruction, if a required operand is a general register location, register address information is routed to reorder buffer 32 and register file 30 simultaneously. Those of skill in the art will appreciate that the x86 register file includes eight 32 bit general registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by other blocks of microprocessor 10. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded.

Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated similar to load/store unit 26 in that any of decode units 20 may dispatch instructions to the floating point unit. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a general register value is being updated and to load/store unit 26 if the contents of a memory location are changed. If the result is to be stored in a general register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into an store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
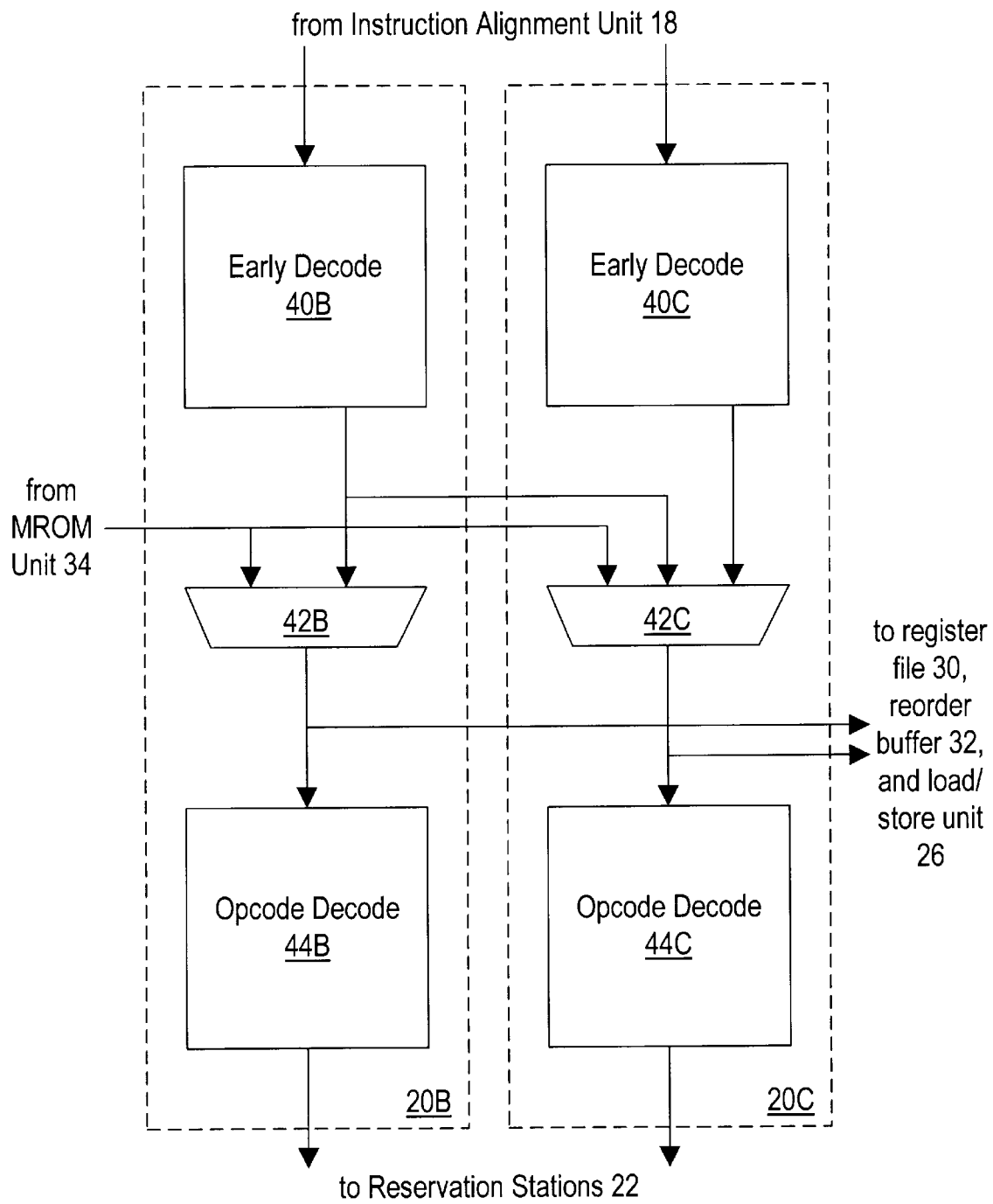
FIG. 2 is a block diagram of one embodiment of two of the decode units shown in FIG. 1.

Turning now to FIG. 2, a block diagram of one embodiment of decode units 20B and 20C are shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexer 42B, and opcode decode unit 44B. Similarly, decode unit 20C includes early decode unit 40C, multiplexer 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexer 42B is included for selecting between the instructions provided by MROM unit 34 and by early decode unit 40B. During times in which MROM unit 34 is dispatching instructions, multiplexer 42B selects instructions provided by MROM unit 34. At other times, multiplexer 42B selects instructions provided by early decode unit 40B. Similarly, multiplexer 42C selects between instructions provided by MROM unit 34, early decode unit 40B, and early decode unit 40C. The instruction from MROM unit 34 is selected during times in which MROM unit 34 is dispatching instructions. During times in which early decode unit 40B detects a double dispatch instruction, the instruction from early decode unit 40B is selected by multiplexer 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;

(ii) decode unconditional branch instructions (which may include the unconditional jump, the CALL, and the RETURN) which were not detected during branch prediction;

(iii) decode source and destination flags;

(iv) decode the source and destination operands which are register operands and generate operand size information; and (v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexers 42 are routed to register file 30, MSR file 31, and reorder buffer 32. Operand values or tags may thereby be routed to reservation stations 22. Additionally, memory operands are detected by early decode units 40. Therefore, the outputs of multiplexers 42 are routed to load/store unit 26. Memory operations corresponding to instructions having memory operands are stored by load/store unit 26.

Figure 3:
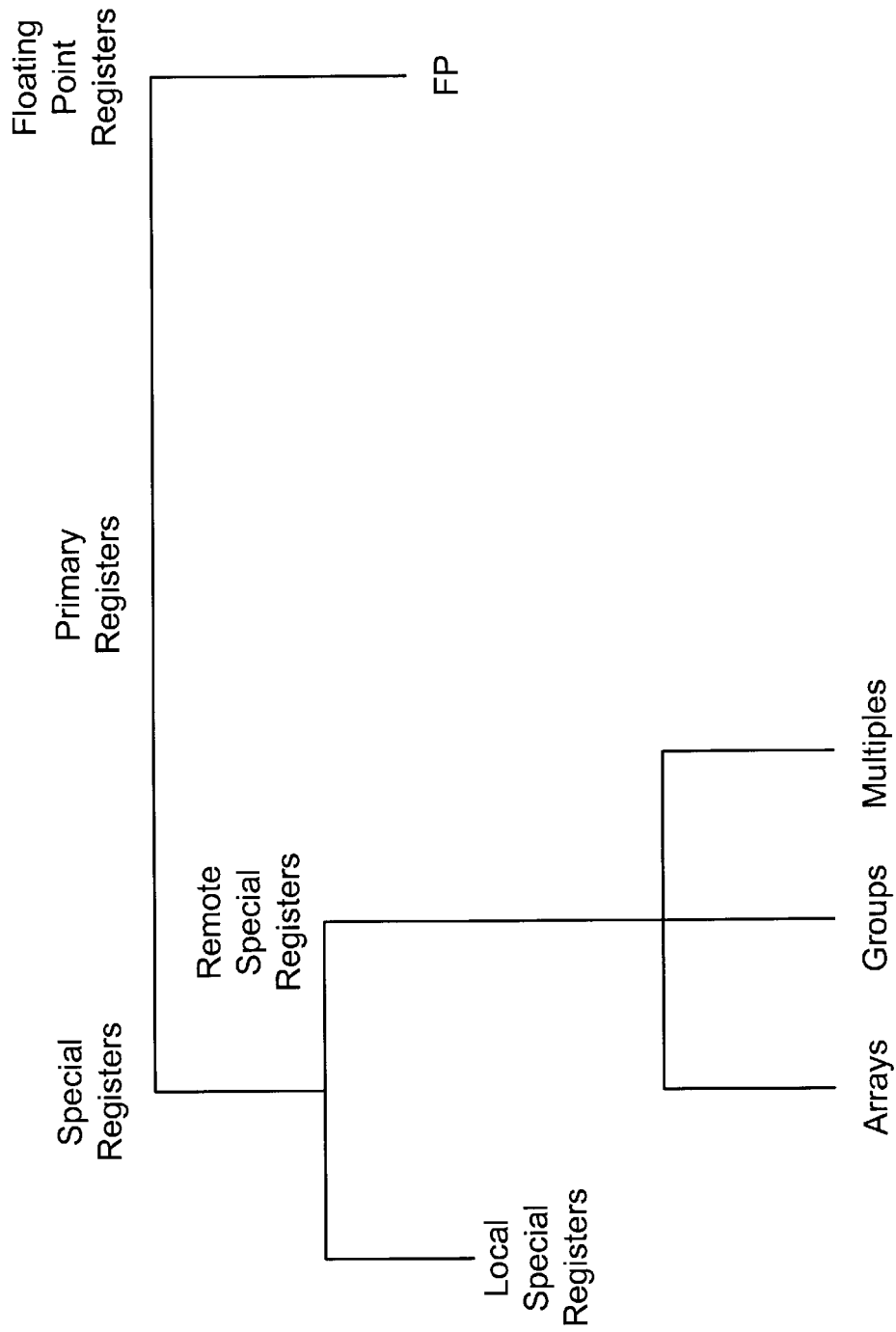
FIG. 3 is a diagram illustrating the hierarchical structure of resources in a microprocessor in accordance with one embodiment of the present invention.

Turning now to FIG. 3, a diagram illustrating one embodiment of a hierarchical structure of resources within a microprocessor is shown. The hierarchy of FIG. 3 is for illustrative purposes only, other processors may utilize other hierarchical structures. The hierarchy includes several register levels. At the top level of the hierarchy is a plurality of primary registers. The primary registers may include performance critical resources such as general registers, segment registers, a flag register and an instruction pointer register. In addition, the top level of the hierarchy includes a special register pointer and a floating point register pointer. Each pointer identifies a second level of the register hierarchy. For example, the top level of the register hierarchy may include 64 primary register addresses. Of the 64 primary register addresses, 62 addresses may identify primary registers. One of the primary register addresses is a pointer to a special register hierarchical level. Another primary register address is a pointer to a floating point register hierarchical level.

In one embodiment, the primary registers are identified directly in the register operand fields of an instruction. The term register operand field identifies an operand field that normally identifies a source or destination register. Generally speaking, an operand field is a portion of an instruction that identifies parameters of an instruction, e.g., source register, destination register, memory address, immediate data or displacement data.

To access a special register, a first register operand field specifies the special register pointer and another operand field, or a register, identifies which special register to access. For example, the special register may be identified by the immediate field of an instruction. Alternatively, a general register or a temporary register may store a value that identifies the special register. Likewise, when a floating point register is accessed, a first operand field identifies the floating point register pointer and another operand field, or register, specifies which floating point register to access.

In one embodiment, the special registers are split between local special registers and remote special registers. The more time critical resources (but not as time critical as the primary registers) are allocated to the local special registers. In one embodiment, the local special registers are located in a special register file. The less time critical special registers are allocated to the remote special registers and may be located throughout the microprocessor. Remote special registers may include arrays, groups or multiples of data. For example, a data cache may be defined as a remote special register. An operand field or a register identifies which element of the array to access. In one embodiment, remote special registers are accessed via a remote special register bus 414. The hierarchical structure discussed above may be extended to include more levels of the hierarchy and/or to include more branches of the hierarchy.

The following instructions illustrate one method of defining instructions to access registers of the hierarchical register structure illustrated in FIG. 3. The following instruction moves data from a local special register DS segment base to primary register tmp0:

MOV tmp0, SR, (srctl=read, ds_base).

The MOV instruction includes three operand fields: two register operand fields and an immediate field. The first operand field specifies the destination register of the move instruction. In the illustrated embodiment, primary register tmp0 is the destination register. The second operand field specifies the source register of the move instruction. In the illustrated embodiment, the second instruction operand does not specify a primary register, but rather specifies a pointer to the special registers. The immediate field of the instruction defines which special register to access and the type of operation to perform on the special register. The immediate field specifies that a read operation is to be performed and specifies the special register as the DS segment base register (ds_base). To most portions of the microprocessor, this instruction appears as a normal register move instruction.

The following pair of instructions illustrates one method of accessing an array such as a data cache array:

MOV SR, tmp1, (srctl=write, array locator word)
MOV temp0, SR, (srctl=array read, dc_data)

In the illustrated embodiment, accessing an element of the data cache array requires two instructions. The first instruction moves data, which identifies the element of the array to access, from general register tmp1 to a special register called an array locator word. This instruction is the same format as the move instruction discussed above. The array locator word is a special register that stores data identifying the element of the array. The second instruction moves the element of a data array to primary register temp0. The first operand field of the move instruction specifies the destination register, the second operand field contains a pointer to the special register, and the immediate field specifies the operation as an array read and identifies the special register as the data cache array. As noted above, the immediate field contains data identifying the special register to access and the type of bus operation. When an instruction that accesses an array is encountered, the array locator word is read to determine which element of the array to access.

The operations, or bus operations, defined in the immediate field include read operations, write operations, array read operations, array write operations, and array invalidate operations. In other embodiments, other bus operations may be defined. The immediate field also identifies the special register to be accessed. For example, if the special register space includes 256 special registers, then an 8-bit address field is used. Each address identifies a unique special register.

Figure 4:
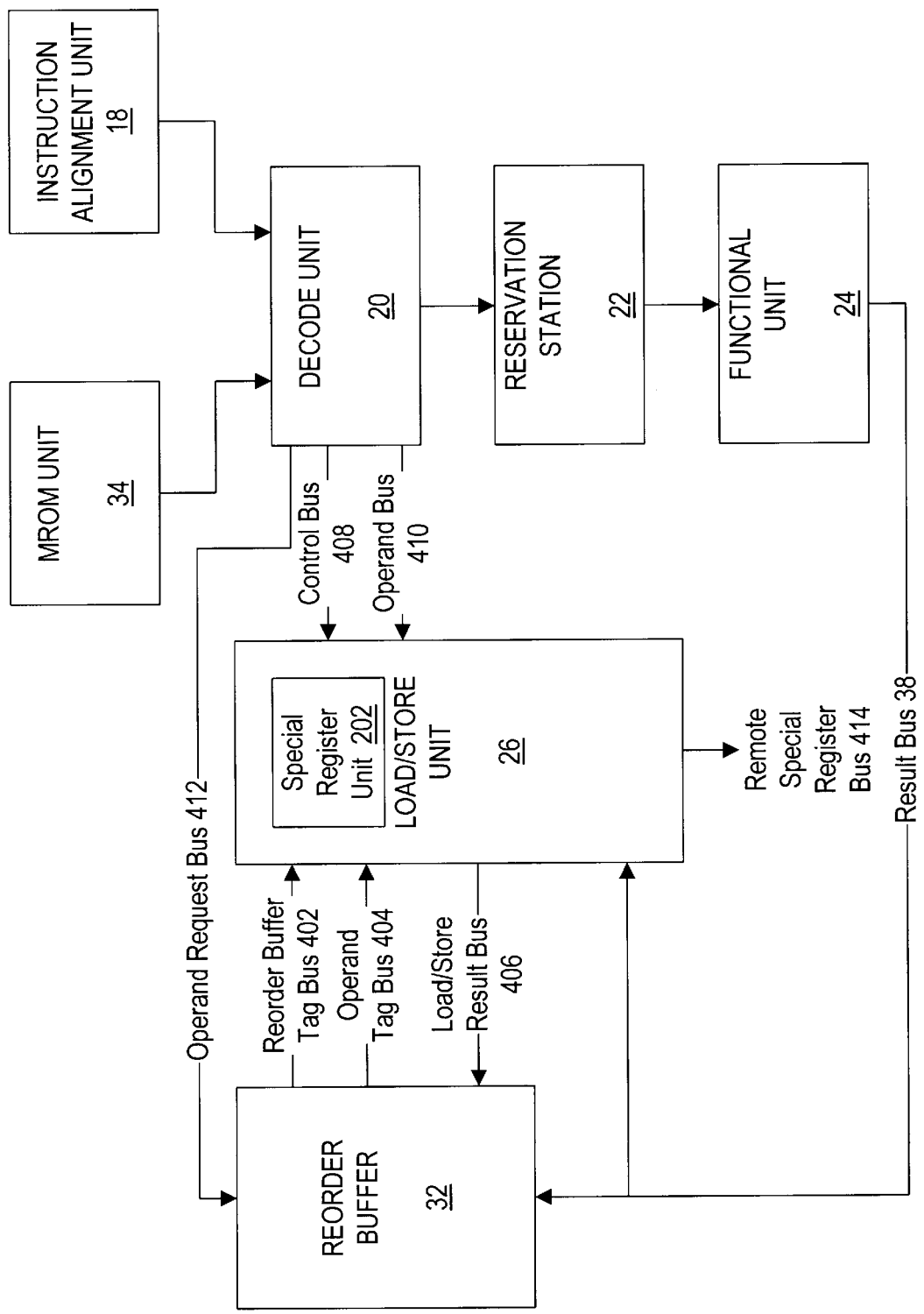
FIG. 4 is a block diagram of a portion of a microprocessor involved in the access of special registers in accordance with one embodiment of the present invention.

Turning now to FIG. 4, portions of a microprocessor that relate to the access of special registers according to one embodiment of the present invention is shown. The portions of the microprocessor include instruction alignment unit 18, decode unit 20, reservations stations 22, functional unit 24, MROM unit 34, load/store unit 26 and reorder buffer 32. Outputs of MROM unit 34 and instruction alignment unit 18 are provided to decode unit 20. Decode unit 20 is coupled to reservation station 22, load/store unit 26 and reorder buffer 32. Reservation station 22 is additionally coupled to functional unit 24. Functional unit 24 is coupled to reorder buffer 32 and load/store unit 26. Load/store unit 26 is coupled to reorder buffer 32.

Special register instructions may be either MROM instructions or fast path instructions. As noted above, MROM instructions are conveyed to MROM unit 34, which parses the instruction into a subset of fast path instructions. The fast path instructions are dispatched from MROM unit 34 to decode unit 20. Alternatively, fast path special register instructions are dispatched directly from instruction alignment unit 18 to decode unit 20. Special register access instructions received by decode unit 20 are handled in a similar manner whether received from MROM unit 34 or instruction alignment unit 18.

In the illustrated embodiment, the special register unit 202 is located within load/store unit 26. Special register unit 202 stores the local special registers which may include the segment registers. Because, in one embodiment, the load/store unit performs most of the segment register operations, special register unit 202 is located within load/store unit 26. In other embodiments, special register unit 202 may be located in other portions of microprocessor 10. Load/store unit 26 may control access to both local special registers and remote special registers. In one embodiment, special register unit 202 includes a local register file for storing local special registers. In one particular embodiment, remote special registers are located in other blocks of the microprocessor and are accessed via a remote special register bus 414.

Upon decode of a special register access instruction, decode unit 20 conveys instruction information to load/store unit 26. Instruction information may include operand and control data. In the illustrated embodiment, operand data is conveyed on op bus 410 and control data is conveyed on control bus 408. The control data includes the type of bus operation and data identifying a special register. In one embodiment, the control data is the same data as the immediate field of the instruction. The operand data may indicate, among other things, the operand of the instruction.

Decode unit 20 additionally conveys an operand request signal to reorder buffer 32 on operand request bus 412. In one embodiment, when reorder buffer 32 receives an operand request signal, it allocates a storage location within reorder buffer 32 for the instruction. Reorder buffer 32 outputs the reorder buffer tag, which identifies the storage location allocated to the instruction, on the reorder buffer tag bus 402. Reorder buffer 32 also performs a dependency check on the operands of the instruction with operands of previous instructions. If the source operand of an instruction is the destination operand of a previous instruction, a dependency exists. If the previous instruction on which the current instruction depends has returned a result, the reorder buffer outputs the result on the operand tag bus 404. If the previous instruction has not returned a result, the reorder buffer returns the reorder buffer tag of the previous instruction on operand tag bus 404. As discussed above, the operand tag is used by load/store unit 26 to capture the general register result from the result bus 38. The load/store unit conveys special register results to reorder buffer 32 via a load/store result bus 406.

In one embodiment, the transfer of data between general registers and special registers is performed by reorder buffer 32 and load/store unit 26. General register data is passed directly from reorder buffer 32 to load/store unit 26. Special register data is passed directly from load/store unit 26 to reorder buffer 32. The special register instruction is retired in reorder buffer 32. In this embodiment, reservation station 22 and functional unit 24 are not involved in the transfer of data between a primary register and a special register. In an alternative embodiment, decode unit 20 additionally passes instruction information to reservation station 22. Special register data is conveyed from load/store unit 26 to reservation station 22. When reservation station 22 receives the operand data from load/store unit 26, reservation station 22 conveys the instruction and the operand data to functional unit 24. Functional unit 24 conveys the special register data to reorder buffer 32 via result bus 38. In this embodiment, load/store result bus 406 is coupled to reservation station 22.

For illustrative purposes, a move instruction from a special register to a general register is discussed. When decode unit 20 encounters a move instruction from a special register to a general register, it asserts an operand request signal to reorder buffer 32 on operand request bus 412. Reorder buffer 32 allocates a storage location for the instruction result and outputs the reorder buffer tag of the allocated storage location to load/store unit 26. Load/store unit 26 additionally receives control data from decode unit 20. The control data indicates the bus operation is a read operation and identifies the source special register. Load/store unit 26 reads the special register identified by the control signal. If the special register is a local special register, the value stored in the special register is read from special register unit 202. If the special register is a remote special register, load/store unit 26 reads the value stored in the remote special register via the remote special register bus 414. Accessing special registers within load/store unit 26 is discussed in more detail below in reference to FIG. 5. Load/store unit 26 outputs the value read from the special register and the reorder buffer tag allocated to the instruction on load/store result bus 406. Reorder buffer 32 receives the special register value and stores it in the storage location allocated for that result.

In one particular embodiment, reorder buffer 32 is a line oriented reorder buffer. In this embodiment, the reorder tag output from the reorder buffer to the load/store unit and the result output from load/store unit 26 to reorder buffer 32 specifies both the line and offset within the line oriented reorder buffer.

A move instruction from a general register to a special register is discussed next. When decode unit 20 encounters a move instruction from a general register to a special register, decode unit 20 outputs an operand request signal to reorder buffer 32 and conveys control data identifying the type of bus operation and the special register to load/store unit 26. In response to the operand request signal, reorder buffer 32 performs dependency checks on the source register. As discussed above, if the source register does not depend on any previous instructions, reorder buffer 32 returns the source register value on operand tag bus 404. Load/store unit 26 stores the source register to the special register identified by the control signal. If, however, the source register depends upon the result of another instruction, reorder buffer 32 returns the tag of the instruction on which the source register depends on operand tag bus 404. Load/store unit 26 monitors result bus 38 to capture the source operand when it becomes available. When load/store unit 26 captures the source operand, it stores the source operand to the special register designated by the control signal. If the special register is a local special register, the source operand is stored in special register unit 202. If the special register is a remote special register, the source operand is stored to the remote special register via the remote special register bus 414. Storing data to local and remote special registers is discussed in more detail below in reference to FIG. 5.

Figure 5:
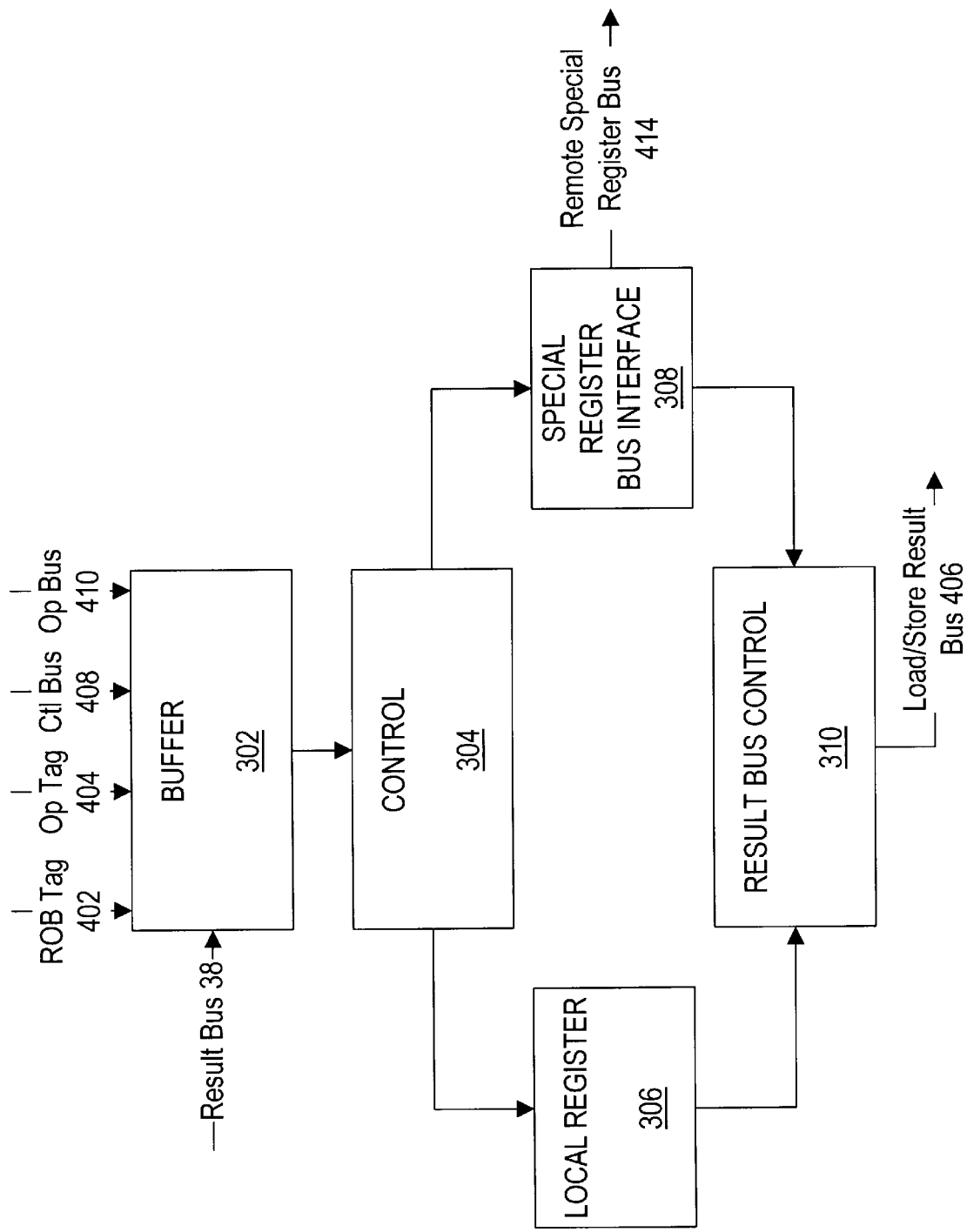
FIG. 5 is a block diagram of a special register unit in accordance with one embodiment of the present invention.

Turning now to FIG. 5, a block diagram of one embodiment of a special register unit 202 is shown. Special register unit 202 includes buffer 302, control 304, local register file 306, special register bus interface 308 and result bus control 310. Buffer 302 receives operand, control and tag data from decode unit 20 and reorder buffer 32. Buffer 302 is a storage device for storing pending special register access instructions. In one embodiment, buffer 302 is a first-in-first-out (FIFO) storage device. Read operations may be issued for execution after the operation and control information is available. Write instructions may be issued for execution after the operands have been captured from result bus 38. In one particular embodiment, buffer 302 acts as a reservation station and allows for non-sequential execution of read operations. All write operations are executed in sequence while read operations can be executed out of sequence as long as there are no write operations to the same special register pending ahead of the read operation in buffer 302. Buffer 302 issues instructions for execution to control 304. Control 304 determines whether the instruction accesses a local special register or a remote special register. Access may be either a read or write operation. If a local special register is accessed, control 304 accesses the local special register from local register file 306. If the instruction accesses a remote special register, control 304 passes control and operand information to special register bus interface 308. Special register bus interface 308 reads or writes to a special register via remote special register bus 414. The register values read during a read operation are passed from local register file 306 or special register bus interface 308 to result bus control 310. Result bus control 310 outputs the register values on load/store result bus 406. Result bus control 310 additionally outputs the tag associated with the read instruction on load/store result bus 406. As discussed above, reorder buffer 32 is coupled to load/store result bus 406. Reorder buffer 32 uses the data from load/store result bus 406 to store the register value in the storage location allocated to a special register read instruction.

Figure 6:
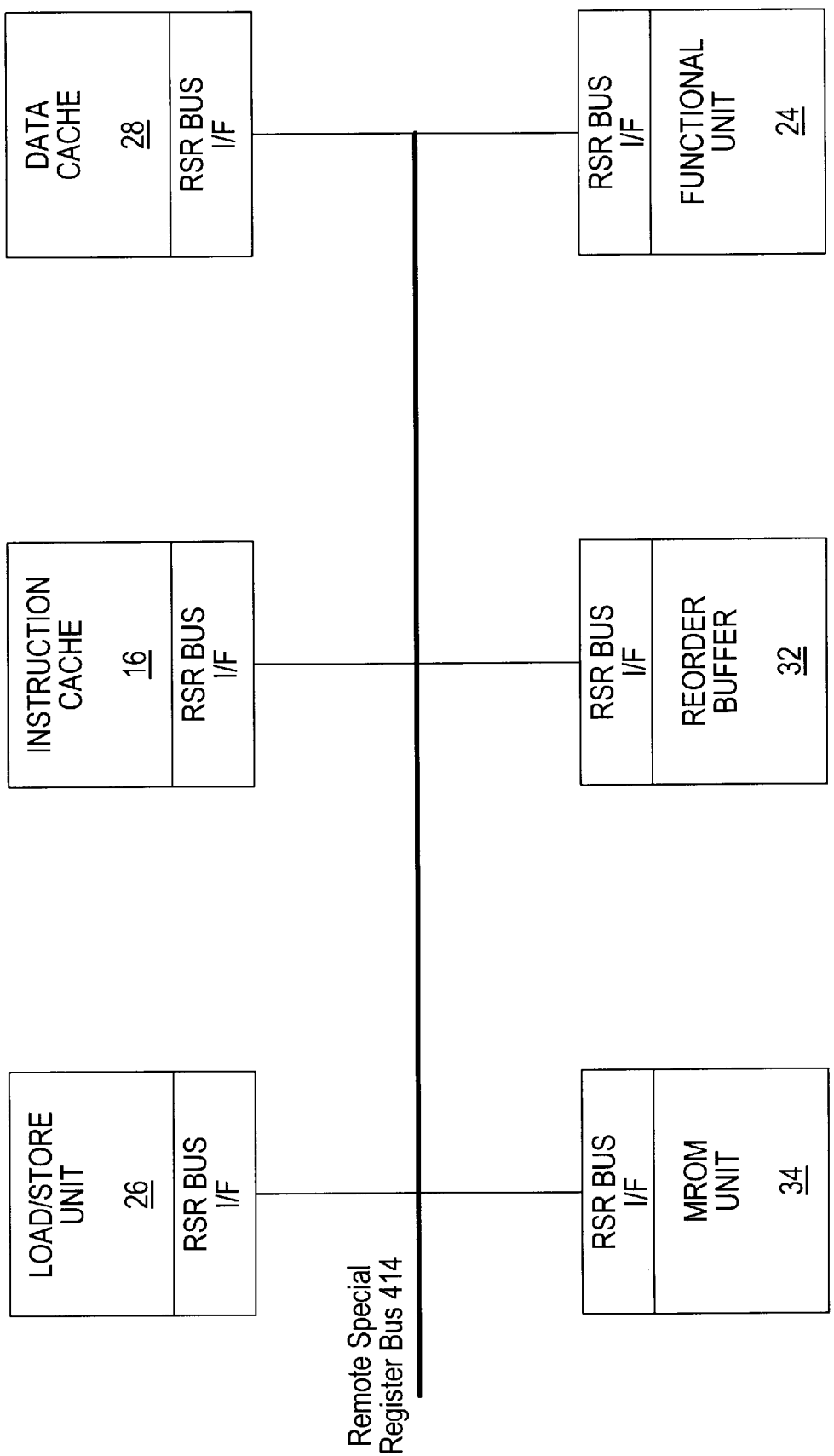
FIG. 6 is a block diagram illustrating the interconnection of the special register bus to portions of a microprocessor in accordance with one embodiment of the present invention.

Turning now to FIG. 6, a block diagram illustrating the interconnection of remote special register bus 414 to portions of microprocessor 10 according to one embodiment of the present invention is shown. In the illustrated embodiment, remote special register bus 414 is coupled to load/store unit 26, instruction cache 16, data cache 28, functional units 24, reorder buffer 32 and MROM unit 34. As discussed above, special registers may be located throughout microprocessor 10. In one embodiment, special registers located in portions of microprocessor 10 other than load/store unit 26 are accessed via remote special register bus 414. Remote special register bus 414 provides a standardized interface for communicating between the blocks of the microprocessor.

Additional special registers may be defined without redesigning or adding additional signals to the microprocessor. For example, adding a new special register to instruction cache 16 does not require any additional control signals to be routed from load/store unit 26 to instruction cache 16. Instruction cache 16 is already coupled to remote special register bus 414. Instruction cache 16 is modified to receive or output data on remote special register bus 414 when the new remote register is addressed. Additionally, new functions or commands can be added without modifying other portions of the microprocessor. For example, to add a flush instruction cache command, a new special register within instruction cache 16 may be defined. Writing a particular data value to the special register may initiate the flush command. Alternatively, an existing special register in cache 16 may receive the sequence that initiates the flush command. In either case, only instruction cache 16 needs to be modified to add the new command. Decode unit 20 treats all moves to special registers in the same manner. Likewise, remote special register bus 414 treats all transfers to special registers in the same manner. If an existing special register is used, only the data being transferred to instruction cache 16 differs. If a new special register is defined, remote special register bus 414 outputs a new address. Remote special register bus 414 may implement any conventional protocol for transferring data between portions of a circuit.

Figure 7:
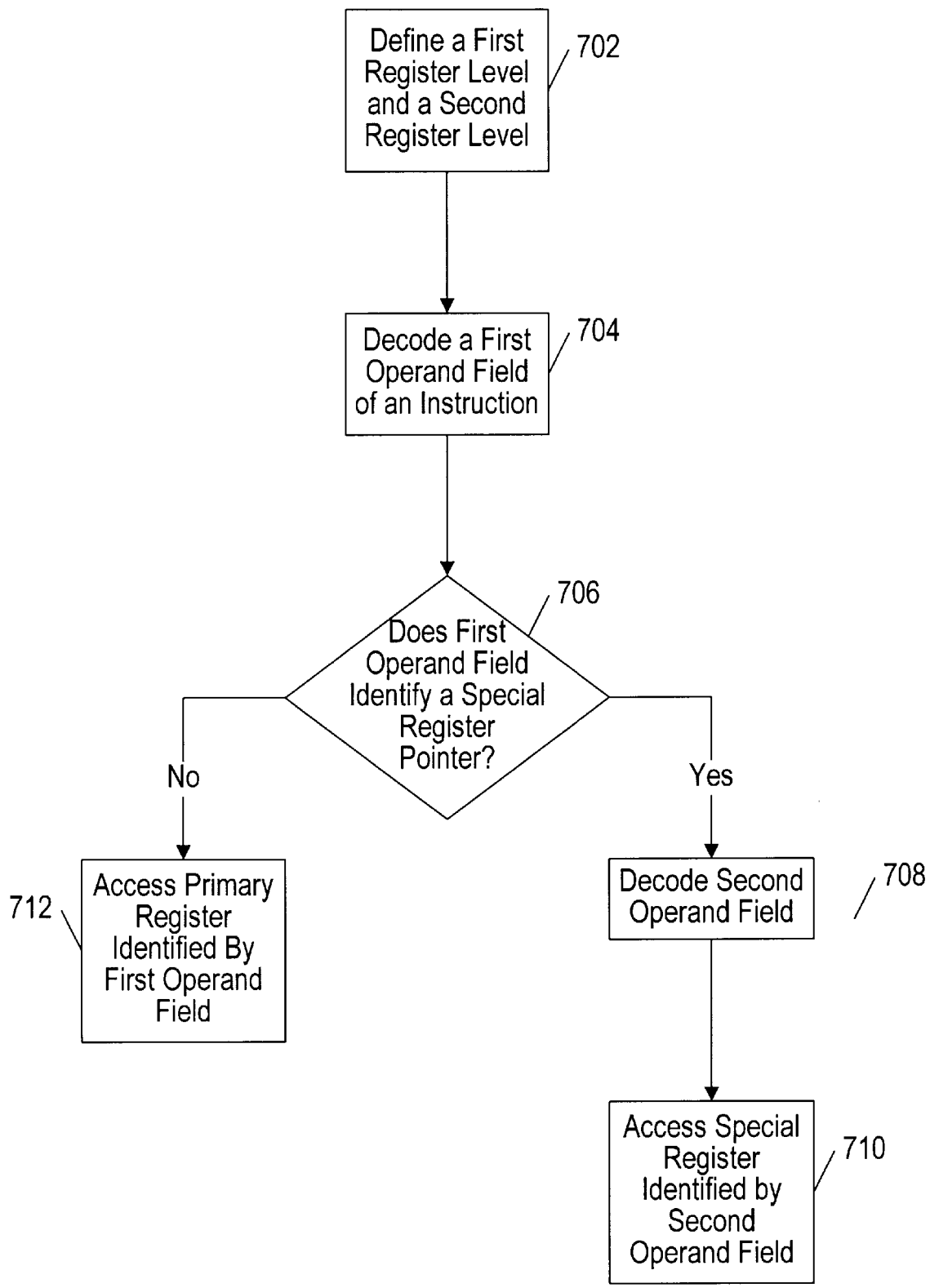
FIG. 7 is a flow chart illustrating the allocation and access of special registers in accordance with one embodiment of the present invention.

Turning now to FIG. 7, a flow chart diagram illustrating the access of a resource according to one embodiment of the present invention is shown. In step 702, a first register level and a second register level is defined. In one embodiment, more time critical registers are allocated to the first register level and less time critical registers are allocated to the second register level. In step 704, a first operand field of an instruction is decoded. In one embodiment, the first operand field identifies either a register allocated to the first register level or a pointer to the second register level. In decisional step 706, it is determined whether the operand field identifies a special register pointer. If the operand field does identify a special register pointer, then in step 708, a second operand field is decoded. The second operand field identifies which of the registers allocated to the second register level to access. In step 710, the register identified by the second operand field is accessed. If in decisional step 706, the first operand field does not specify a special register pointer, then in step 712, the primary register identified by the first operand field is accessed. In other embodiments, the first register level may include more than one pointer. For example, the first register level may include a pointer to floating point registers in addition to special registers. In this alternative embodiment, if the first operand field identifies the floating register pointer, then the second operand field is decoded to determine which floating point operand to access.

Figure 8A:
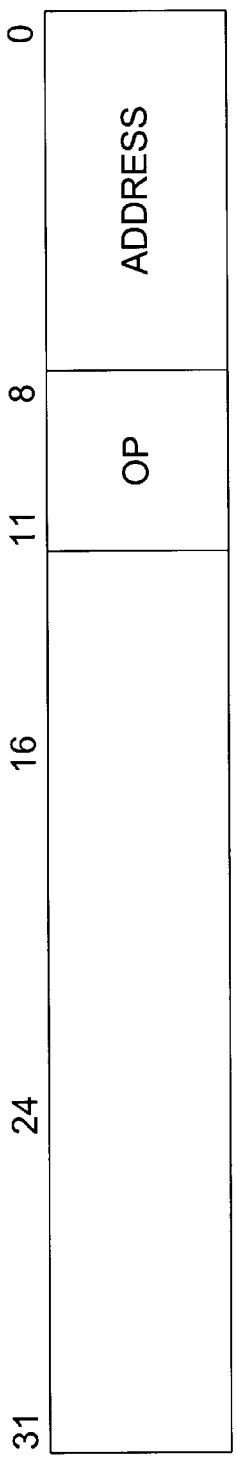
FIG. 8A is a diagram of a control word in accordance with one embodiment of the present invention.

FIG. 8A illustrates a command word output on the special register bus according to one embodiment of the present invention. The command word identifies a type of bus operation and an address of a special register. In the illustrated embodiment, the operation field is 4-bits and thus may specify 16 bus operations. For example, the operation field may indicate that the bus operation is a read from a special register, a write to a special register, an array read, an array write, or an array invalidate. The address field is 8-bits and thus may specify up to 256 special registers.

Figure 8B:
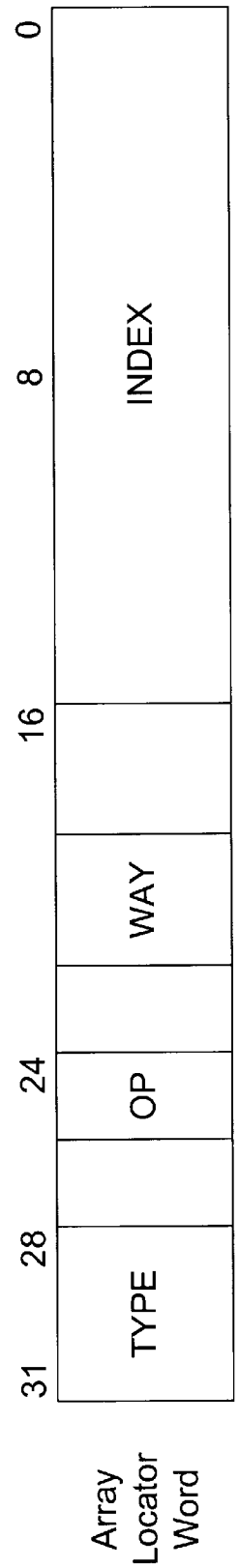
FIG. 8B is a diagram of an array locator word in accordance with one embodiment of the present invention.

FIG. 8B illustrates an array locator word according to one embodiment of the present invention. As discussed above, when an array is accessed, the array locator word indicates the element of the array to access. In the illustrated embodiment, the array locator word includes a type field, an op field, a way field and an index field. The type field defines a subarray within the array addressed by the command word. For example, the tag field may identify a data array, a tag array, a predecode array, a way prediction array, or a prefetch buffer array. Other subarrays may be defined in other implementations of a microprocessor. The op field definition depends on the command word. For example, when an array is invalidated, the op field defines the type of invalidation. For example, the op field may identify a global invalidate, a line invalidate or a line invalidate based on date. The way field selects one of the ways in the array. The index field contains the row and word addresses of the element to access.

Figure 9:
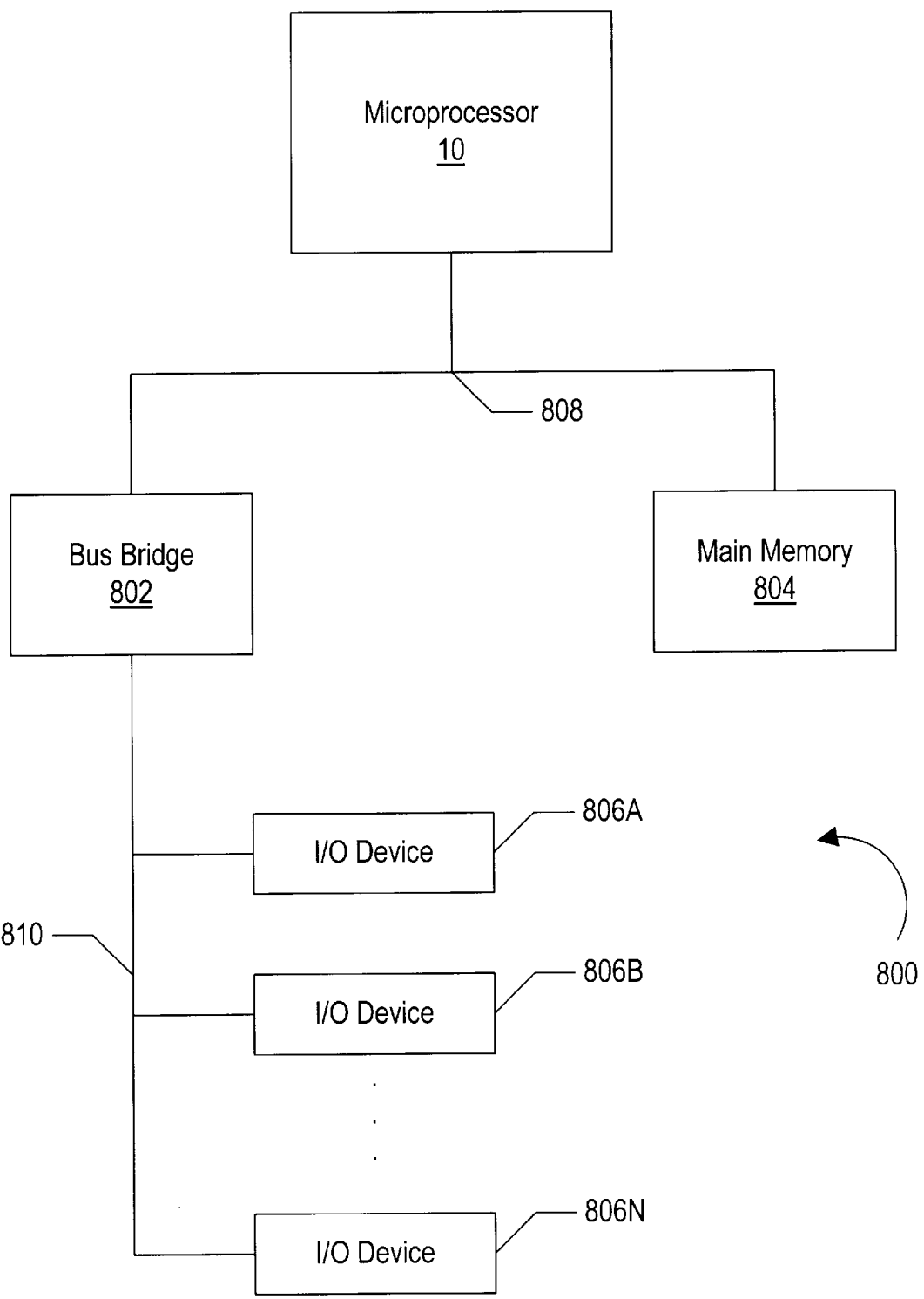
FIG. 9 is a block diagram of a computer system including the microprocessor shown in FIG. 1.

Turning now to FIG. 9, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 9 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration.

Although the x86 microprocessor architecture and instruction set have been used as a specific example herein, it is noted that the apparatus and method described herein may be applicable to any microprocessor which employs model specific registers. Such embodiments are contemplated.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical 0 value or, conversely, when it conveys a logical 0 value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, 1 of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1 x86 Fast Path, Double Dispatch, and MROM Instructions

| X86 Instruction | Instruction Category |
| --- | --- |
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path/double dispatch |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |

TABLE 1-continued x86 Fast Path, Double Dispatch, and MROM Instructions

| X86 Instruction | Instruction Category |
| --- | --- |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MROM |
| LSL | MROM |
| LTR | MROM |
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | fast path/double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |

TABLE 1-continued x86 Fast Path, Double Dispatch, and MROM Instructions

| X86 Instruction | Instruction Category |
|---|---|
| RSM | MROM |
| SAHF | fast path |
| SAL | fast path |
| SAR | fast path |
| SHL | fast path |
| SHR | fast path |
| SBB | fast path |
| SCAS | double dispatch |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

Note: Instructions including an SIB byte are also considered double dispatch instructions.

It is noted that other aspects regarding superscalar microprocessors may be found in the following co-pending, commonly assigned patent applications: "A Line-Oriented Reorder Buffer for a Superscalar Microprocessor", Ser. No. 08/690,385 filed Jul. 26, 1996 by Witt, et al. now U.S. Pat. No. 5,878,244; "Linearly Addressable Microprocessor Cache", Ser. No. 08/146,381, filed Oct. 29, 1993 by Witt now U.S. Pat. No. 5,761,691; "Superscalar Microprocessor Including a High Performance Instruction Alignment Unit", Ser. No. 08/377,843, filed Jan. 25, 1995 by Witt, et al. now U.S. Pat. No. 5,819,057; "A Way Prediction Structure", Ser. No. 08/522,181, filed Aug. 31, 1995 by Roberts, et al. now U.S. Pat. No. 5,845,323; "A Data Cache Capable of Performing Store Accesses in a Single Clock Cycle", Ser. No. 08/521,627, filed Aug. 31, 1995 by Witt, et al. now U.S. Pat. No. 5,860,104; "A Parallel and Scalable Instruction Scanning Unit", Ser. No. 08/475,400, filed Jun. 7, 1995 by Narayan now U.S. Pat. No. 5,875,315; and "An Apparatus and Method for Aligning Variable-Byte Length Instructions to a Plurality of Issue Positions", Ser. No. 08/582,473, filed Jan. 2, 1996 by Narayan, et al. now U.S. Pat. No. 5,822,559. The disclosure of these patent applications are incorporated herein by reference in their entirety.

Numerous variations and modifications will become apparent to those skilled in the art once the above disclosure is fully appreciated. It is intended that the following claims be interpreted to embrace all such variations and modifications.

What is claimed is:

1. A microprocessor comprising:
    a plurality of units arranged in a pipeline to effect execution of instructions, each of said plurality of units including at least one of a plurality of resources accessible via execution of an instruction specifying, in an operand field of said instruction, one of a plurality of special register addresses assigned to said plurality of resources;
    a remote special register bus coupled to each of said plurality of units; and
    a special register unit coupled to said remote special register bus, wherein said special register unit is configured to access said one of said plurality of resources in response to said instruction, said special register unit configured to access said one of said plurality of resources using said remote special register bus to access said one of said plurality of resources;
    wherein said each of said plurality of units comprises a remote special register bus interface for interfacing between said one of said plurality of resources and said remote special register bus.

2. The microprocessor as recited in claim 1 wherein said special register unit comprises a register file including one or more special registers, wherein said one or more special registers are identified in said operand field of said instruction using a second plurality of special register addresses separate from said plurality of special register addresses.

3. The microprocessor as recited in claim 1 wherein said plurality of units include a reorder buffer.

4. The microprocessor as recited in claim 1 wherein said plurality of units include a microcode unit.

5. The microprocessor as recited in claim 1 wherein said plurality of units include a cache.

6. The microprocessor as recited in claim 1 further comprises a decode unit coupled to said special register unit, wherein said decode unit is configured to decode said instruction and determine that said instruction accesses a special register.

7. The microprocessor as recited in claim 6 further comprising a microcode unit coupled to said decode unit and an instruction alignment unit coupled to said decode unit, wherein said instruction is sourceable from either said microcode unit or said instruction alignment unit.

8. A method for accessing a plurality of resources in a microprocessor, the method comprising:
    decoding an instruction coded to access one of said plurality of resources;
    transmitting said instruction to a special register unit;
    determining if said one of said plurality of resources is local or remote; and
    transmitting, upon a remote special register bus, a command from said special register unit to a second unit including said one of said plurality of resources if said one of said plurality of resources is remote.

9. The method as recited in claim 8 further comprising reading a local register file within said special register unit if said one of said plurality of resources is local.

10. The method as recited in claim 8 wherein said second unit comprises a reorder buffer.

11. The method as recited in claim 8 wherein said second unit comprises a microcode unit.

12. The method as recited in claim 8 wherein said second unit comprises a cache.

13. The method as recited in claim 8 wherein said decoding comprises decoding a first operand field of said instruction.

14. The method as recited in claim 13 wherein an encoding of said first operand field comprises a pointer indicating that said operand is specified in a second operand field of said instruction.

15. The method as recited in claim 14 further comprising assigning a plurality of special register addresses to said plurality of resources.

16. The method as recited in claim 15 further comprising coding said second operand field with one of said plurality of special register addresses to access a corresponding one of said plurality of resources.

17. A computer system comprising:
   a microprocessor including:
      a plurality of units arranged in a pipeline to effect execution of instructions, each of said plurality of units including at least one of a plurality of resources accessible via execution of an instruction specifying, in an operand field of said instruction, one of a plurality of special register addresses assigned to said plurality of resources;
      a remote special register bus coupled to each of said plurality of units; and
      a special register unit coupled to said remote special register bus, wherein said special register unit is configured to access said one of said plurality of resources in response to said instruction, said special register unit configured to access said one of said plurality of resources using said remote special register bus to access said one of said plurality of resources;
      wherein said each of said plurality of units comprises a remote special register bus interface for interfacing between said one of said plurality of resources and said remote special register bus; and
   an input/output (I/O) device coupled to said microprocessor, wherein said I/O device is configured to communicate between said computer system and another computer system to which said I/O device is coupled.

18. The computer system as recited in claim 17 wherein said I/O device comprises a modem.

19. A computer system comprising:
   a microprocessor with flexible resource access including:
      a decode unit configured to decode a first operand field of an instruction, wherein said first operand field identifies a primary register or a pointer to a plurality of special registers; and
      a special register unit coupled to said decode unit wherein if said first operand field identifies said pointer to said plurality of special registers:
         said decode unit is configured to convey instruction information to said special register unit,
         said special register unit is configured to decode a second operand field, and
         said special register unit is configured to access a special register identified by said second operand field; and
   an input/output (I/O) device coupled to said microprocessor, wherein said I/O device is configured to communicate between said computer system and another computer system to which said I/O device is coupled.

20. The computer system as recited in claim 19 wherein said I/O device comprises a modem.

* * * * *